3,260,713
WATER-SOLUBLE MONOAZO-DYESTUFFS
Jonas O. St. Alban, West Warwick, R.I., assignor to Farbwerke Hoechst Aktiengesellschaft vormals Meister Lucius & Bruning, Frankfurt am Main, Germany, a corporation of Germany
No Drawing. Filed May 6, 1963, Ser. No. 278,478
Claims priority, application Germany, May 5, 1962, F 36,724
8 Claims. (Cl. 260—163)

The present invention relates to valuable water-soluble monoazo-dyestuffs and to a process for preparing them; more particularly it relates to dyestuffs having the following general formula

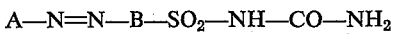

A—N=N—B—SO$_2$—NH—CO—NH$_2$ wherein A represents the radical of an azo coupling component containing a hydroxyl group and further containing at least one group imparting solubility in water, and B represents a radical of the benzene or naphthalene series.

It has been found that novel, water-soluble monoazo-dyestuffs capable of being fixed by thermofixation are obtained by coupling the diazo compound of an aminoarylsulfonyl urea or a substitution product thereof with an azo coupling component containing at least one group imparting solubility in water as, for example, a sulfonic acid or carboxylic acid group. With the dyestuffs so obtained vegetable fibers, such as cotton, or regenerated cellulose fibers can be dyed, padded or printed from a weakly acid solution, and after heating at about 140° to 160° C. dyeings and prints are produced which are distinguished by an excellent fastness to wet processing.

There is thus obtained, for example, from 4-aminobenzene-sulfonyl urea by diazotizing and coupling with 1-(4'-sulfophenyl)-3-methyl-5-pyrazolone an azo-dyestuff of the following constitution

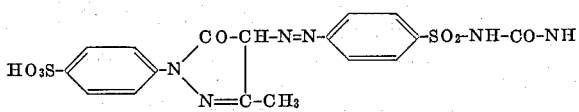

The water-insoluble dyestuff acid is dissolved in water by adding subequivalent amounts of ammonia so that the solution is still weakly acid. When a cotton fabric is padded with this liquor and dried, a yellow dyeing is obtained which is not fast to washing and can easily be removed from the fabric. However, when the padded and dried fabric is heated for 5 to 10 minutes at a temperature in the range from about 140° to 160° C., a yellow dyeing possessing an excellent fastness to wet processing is obtained after rinsing and soaping. Such a dyeing is absolutely fast even to boiling dilute sodium hydroxide solution. This effect attained by introducing a sulfonyl urea group into water-soluble azo-dyestuffs is surprising and could in no way be foreseen.

As diazo components there may be used in addition to ortho-, meta- and para-aminobenzene-sulfonylureas also their derivatives substituted, for example, by alkyl, halogen, alkoxy, alkylsulfonyl, trifluoromethyl and/or nitro groups as, for example, 4-amino-3-methylbenzene-sulfonyl urea,
4-amino-3-chlorobenzene-sulfonyl urea,
4-amino-3-methoxybenzene-sulfonyl urea,
4-amino-2,5-dimethoxybenzene-sulfonyl urea,
4-amino-2,5-diethoxybenzene-sulfonyl urea,
4-amino-2-methyl-5-methoxybenzene-sulfonyl urea,
4-amino-2-chloro-5-methoxybenzene-sulfonyl urea,
4-amino-5-methyl-2-chlorobenzene-sulfonyl urea,
4-amino-3-methylsulfonylbenzene-sulfonyl urea or
4-amino-3-nitrobenzene-sulfonyl urea, furthermore 3-amino-4-methylbenzene-sulfonyl urea,
3-amino-4-chlorobenzene-sulfonyl urea,
3-amino-4-bromobenzene-sulfonyl urea,
3-amino-4-methoxybenzene-sulfonyl urea,
3-amino-4,6-dimethoxybenzene-sulfonyl urea,
3-amino-4-methyl-6-methoxybenzene-sulfonyl urea,
3-amino-4-methoxy-6-methylbenzene-sulfonyl urea,
2-amino-4-chlorobenzene-sulfonyl urea or
1-aminonaphthalene-4-sulfonyl urea.

In the process of the present invention there may be used as azo coupling components, for example, 1-acetyl-amino-8-hydroxynaphthalene-3,6- or -4,6-disulfonic acid, 2-hydroxynaphthalene-6- or -8-sulfonic acid, 2-hydroxynaphthalene-3,6- or -6,8-disulfonic acid, 2-amino- or 2-acetamino-8-hydroxynaphthalene-6-sulfonic acid, 2-amino-5-hydroxynaphthalene-7-sulfonic acid and their derivatives, furthermore 2-hydroxynaphthalene-3-carboxylic acid, 1,3-diaminobenzene-4-sulfonic acid, salicylic acid, phenyl-pyrazolone-carboxylic acids, phenyl-methyl-pyrazolone-sulfonic acids, acetoacetylaminobenzene-sulfonic acids or acetoacetylaminobenzene-carboxylic acids.

In addition to the method described above, cotton fabrics may also be dyed, padded or printed with the novel azo-dyestuffs by dissolving the neutral ammonium salts of the dyestuffs in water and acidifying the liquor by adding small amounts of inorganic or organic acids, while the dyestuff is still dissolved. The dyed, padded or printed fabrics are dried and then subjected to thermofixation at about 140° to 160° C. Depending on the conditions used, 1 to 10 minutes are sufficient for the thermofixation.

After washing and soaping the dyed and thermofixed fabrics, yellow, orange, red or brown dyeings possessing a very good fastness to wet processing are obtained.

The present invention represents a considerable technical advance since it enables the manufacture of azo-dyestuffs from inexpensive components which can easily be prepared. By thermofixing these azo-dyestuffs on vegetable fibers or regenerated cellulose fibers dyeings and prints are produced which are distinguished by good fastness properties, especially by a very good fastness to wet processing.

The following examples serve to illustrate the invention, but they are not intended to limit it thereto, the parts being by weight unless otherwise stated, and the relationship of parts by weight to parts by volume being the same as that of the kilogram to the liter.

*Example 1*

11 parts of 3-aminobenzene-sulfonyl urea are dissolved in 50 parts by volume of 1 N-sodium hydroxide solution, and a solution of 3.5 parts of sodium nitrite in 30 parts by volume of water is added. This solution is added dropwise, while stirring, to a mixture of 70 parts by volume of 2 N-hydrochloric acid and 100 parts of ice, the temperature being maintained between 0° and 5° C. by adding ice and cooling. After stirring for 10 minutes, the nitrite in excess is destroyed with a small amount of amido-sulfonic acid, and, while cooling, 2 N-sodium hydroxide solution is added, until a pH-value of 6.5 is attained.

12 parts of 1-(4'-sulfophenyl)-3-methyl-5-pyrazolone and 23 parts of sodium carbonate are dissolved in 200 parts by volume of water. The above diazonium salt solution is run into the mixture at 10° C., while vigorously stirring. After stirring at room temperature for about 3 hours, the mixture is heated to 40° C., clarified with kieselgur, and the dyestuff is precipitated from the filtrate with concentrated hydrochloric acid. After filtering with suction and drying, 20 parts of a dyestuff of the following constitution

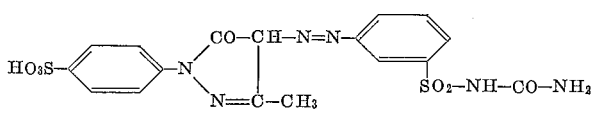

are obtained.

For dyeing 20 parts of this dyestuff are dissolved in 1000 parts by volume of water with the addition of a small amount of ammonia (about 3 parts by volume of 25% strength) and a cotton fabric is padded with this solution. The padded cotton is dried at 80° to 100° C. and then heated at 140° to 160° C. for 5 to 10 minutes. A yellow dyeing is obtained which after washing and soaping possesses a very good fastness to wet processing and a good fastness to light.

When 20 parts of the dyestuff acid are dissolved in 300 parts by volume of hot water with the addition of ammonia so that the solution still shows a weakly acid reaction, 400 parts by volume of a neutral sodium-alginate-thickening of 4% strength and further 280 parts by volume of water are added, there is obtained after printing on mercerized cotton, drying, thermo-fixing for 10 minutes at about 145° C. and washing with water and a soap solution, a yellow print possessing a very good fastness to wet processing and a good fastness to light.

In an analogous manner, there may be prepared by the process of the present invention from diazotized 3-aminobenzene-sulfonyl urea and other azo coupling components azo-dyestuffs having good fastness properties, the tints of which are indicated in the following table.

Azo coupling component:
    2-hydroxynaphthalene-6-sulfonic acid __ Orange.
    2-hydroxynaphthalene-8-sulfonic acid __ Yellow-orange.
    2-hydroxynaphthalene-3.6-disulfonic acid _____ Pink.
    2-hydroxynaphthalene-6.8-disulfonic acid _____ Orange.
    2-acetamino-5-hydroxynaphthalene-7-sulfonic acid _____ Orange-brown.
    2-acetamino-8-hydroxynaphthalene-6-sulfonic acid _____ Scarlet.
    1-acetamino-8-hydroxynaphthalene-3.6-disulfonic acid _____ Red.
    Salicylic acid _____ Yellow.
    2.3-hydroxynaphthoic acid _____ Scarlet.
    1 - phenyl - 5 - pyrazolone - 3 - carboxylic acid _____ Yellow.
    1 - (3' - sulfophenyl) - 3 - methyl-5-pyrazolone _____ Yellow.
    1-acetoacetylaminobenzene-4-sulfonic acid _____ Yellow.

*Example 2*

11 parts of 4-aminobenzene-sulfonyl urea are dissolved in 50 parts by volume of 1 N-sodium hydroxide solution, and a solution of 3.5 parts of sodium nitrite in 30 parts by volume of water is added. The solution so obtained is run, while stirring, into a mixture of 80 parts by volume of 2 N-hydrochloric acid and 100 parts of ice, the temperature being maintained between 0° and 5° C. by adding ice and cooling with ice. After stirring for about 10 minutes, the precipitated diazonium salt is filtered off with suction, and the salt is dispersed, while still moist, in 200 parts by volume of ice water.

18.2 parts of 1-acetamino-8-hydroxynaphthalene-3.6-disulfonic acid and 31 parts of sodium carbonate are dissolved in 200 parts by volume of water. The suspension of the diazonium salt is run at 10° C. into the mixture, while stirring. After stirring at room temperature for about 3 hours, the mixture is heated to 40° C., clarified with kieselguhr, and the dyestuff is salted out. The isolated sodium salt is dissolved in a small amount of water, and the dyestuff acid is precipitated with concentrated hydrochloric acid, while cooling with ice. After drying 15 parts of a deystuff of the following constitution

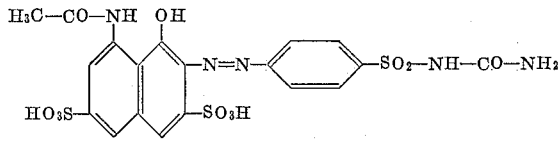

are obtained.

The fixation of this dyestuff on cotton is carried out as described in Example 1. A red dyeing is obtained which possesses a very good fastness to wet processing and a good fastness to light.

In an analogous manner there may be prepared from diazotized 4-aminobenzene-sulfonyl urea and other azo coupling component azo-dyestuffs, the tints of which are indicated in the following table:

Azo coupling component:      Tint
    2-hydroxynaphthalene-6-sulfonic acid __ Orange-red.
    2-hydroxynaphthalene-8-sulfonic acid __ Golden yellow.
    2-hydroxynaphthalene-3.6-disulfonic acid _____ Red.
    2-hydroxynaphthalene-6.8-disulfonic acid _____ Orange.
    2-acetamino-5-hydroxynaphthalene-7-sulfonic acid _____ Red.
    2-acetamino-8-hydroxynaphthalene-6-sulfonic acid _____ Red.
    Salicylic acid _____ Yellow.
    2.3-hydroxynaphthoic acid _____ Bluish red.
    1-phenyl-5-pyrazolone-3-carboxylic acid _____ Golden yellow.
    1-(4'-sulfophenyl)-3-methyl-5-pyrazolone _____ Yellow.
    1-(3'-sulfophenyl)-3-methyl-5-pyrazolone _____ Yellow.
    1-acetoacetylaminobenzene-4-sulfonic acid _____ Yellow.

*Example 3*

11 parts of 2-aminobenzene-sulfonyl urea was dissolved in 50 parts by volume of 1 N-sodium hydroxide solution, and a solution of 3.5 parts of sodium nitrite in 30 parts by volume of water is added. The solution so obtained is added dropwise, while stirring, to a mixture of 70 parts by volume of 2 N-hydrochloric acid and 100 parts of ice, the temperature being maintained between 0° and 5° C. by cooling. After stirring for 10 minutes, the nitrite in excess is destroyed with a small amount of amido-sulfonic acid, and 2 N-sodium hydroxide solution is added, while cooling, until a pH-value of 6.5 is attained.

9.5 parts of 2.3-hydroxynaphthoic acid and 23 parts of sodium carbonate are dissolved in 200 parts by volume of water. The above diazonium salt solution is introduced at 10° C., while vigorously stirring. After stirring at room temperature for about 3 hours, the mixture is heated to 40° C., clarified with kieselguhr, and the dyestuff acid is precipitated from the filtrate with concentrated hydrochloric acid. After filtering with suction and drying 15 parts of a dyestuff having the following constitution

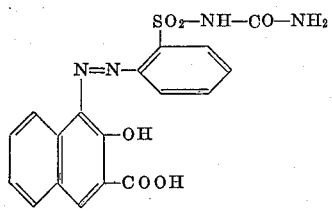

are obtained.

The fixation of this dyestuff on cotton is carried out as described in Example 1. A red dyeing possessing a very good fastness to wet processing is obtained.

Example 4

12.2 parts of 3-methoxy-4-aminobenzene-sulfonyl urea are dissolved in 80 parts by volume of 1 N-sodium hydroxide solution, and a solution of 3.5 parts of sodium nitrite in 30 parts by volume of water is added. This solution is run, while stirring, into a mixture of 80 parts by volume of 2 N-hydrochloric acid and 100 parts of ice, the temperature being maintained at 0° to 5° C. by adding ice. After stirring for 10 minutes, the nitrous acid in excess is removed.

15.5 parts of 2-hydroxynaphthalene-6.8-disulfonic acid are dissolved in 200 parts by volume of water with the addition of 2 N-sodium hydroxide solution, until a pH-value of 8 to 8.5 is attained. The above diazonium salt solution is added dropwise to the mixture at 10° C., while stirring, the pH-value of the solution being maintained at 8 to 9 by adding 2 N-sodium hydroxide solution. After stirring at room temperature for about 3 hours, the solution is heated to 40° C., clarified with kieselguhr, and the dyestuff is salted out from the weakly acidified solution with ammonium chloride. The suction-filtered dyestuff is again dissolved in water and salted out with ammonium chloride. After filtering with suction and drying there are obtained 19 parts of the ammonium salt of a dyestuff having the following constitution

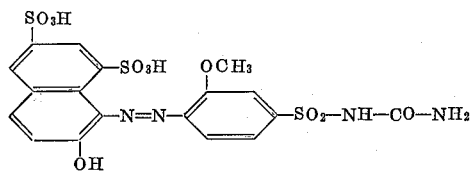

This dyestuff is fixed on cotton as described in Example 1. An intense orange dyeing possessing a very good fastness to wet processing is obtained.

In an analogous manner there are obtained from the diazotized aromatic amines containing a sulfonyl urea group by coupling with azo coupling components containing groups imparting solubility in water dyestuffs which yield on cotton after thermofixation dyeings having a very good fastness to wet processing and showing the tints indicated in the following table.

| Diazo component | Azo coupling component | Tint |
|---|---|---|
| 1-aminonaphthalene-4-sulfonyl urea. | 2-hydroxynaphthalene-3.6-disulfonic acid. | Claret-red. |
| 4-amino-3-nitrobenzene-sulfonyl urea. | 1-(4'-sulfophenyl)-3-methyl-5-pyrazolone. | Yellow. |
| 4-amino-2.6-dimethyl-benzene-sulfonyl urea. | 2-acetamino-8-hydroxy-naphthalene-6-sulfonic acid. | Red. |
| Do | 1-phenyl-5-pyrazolone-3-carboxylic acid. | Golden yellow. |
| 4-amino-3-chlorobenzene-sulfonyl urea. | 8-acetamino-1-hydroxy-naphthalene-3.6-disulfonic acid. | Red. |
| Do | 2-acetamino-8-hydroxy-naphthalene-6-sulfonic acid. | Orange. |
| Do | 2-hydroxynaphthalene-3.6-disulfonic acid. | Do. |
| 4-amino-2.5-dimethoxybenzene-sulfonyl urea. | ____do____ | Bluish red. |
| Do | 8-acetamino-1-hydroxy-naphthalene-3.6-disulfonic acid. | Violet. |
| 4-amino-3-methylbenzenesulfonyl urea. | ____do____ | Red. |
| Do | 2-acetamino-8-hydroxy-naphthalene-6-sulfonic acid. | Scarlet. |
| Do | 1-(4'-sulfophenyl)-3-methyl-5-pyrazolone. | Yellow. |

I claim:
1. Water-soluble monoazo-dyestuffs of the formula

$$A-N=N-B-SO_2-NH-CO-NH_2$$

wherein A is a benzene, naphthalene, acetoacetylaminobenzene, acetylamino-naphthalene or pyrazolone azo coupling component having a hydroxyl group on a carbon atom adjacent the diazo bridge and at least one carboxylic acid or sulfonic acid substituent, and B represents a member selected from the group consisting of radicals of the benzene and naphthalene series.

2. A water soluble dyestuff as defined in claim 1 wherein the radicals of the benzene and naphthalene series are selected from the group consisting of unsubstituted radicals and radicals having substituents selected from the group consisting of lower alkyl, halogen, lower alkylsulfonyl, lower alkoxy, trifluoromethyl and nitro.

3. Water-soluble monoazo-dyestuffs of the formula $$A-N=N-B-SO_2-NH-CO-NH_2$$

wherein A is a benzene, naphthalene, acetoacetylaminobenzene, acetylamino-naphthalene or pyrazolone azo coupling component having a hydroxyl group on a carbon atom adjacent the diazo bridge and at least one carboxylic acid or sulfonic acid substituent, and B represents a member selected from the group consisting of phenyl, chlorophenyl, methylphenyl, nitrophenyl, methoxyphenyl, dimethoxyphenyl and dimethylphenyl, the azo group standing in para-position to the group $$-SO_2-NH-CO-NH_2.$$

4. The water-soluble monoazo-dyestuff of the formula

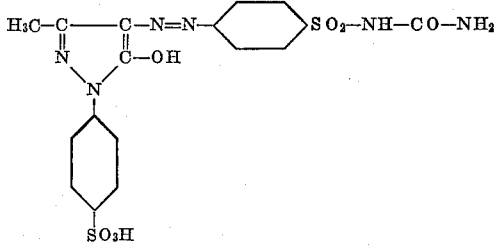

5. The water-soluble monoazo-dyestuff of the formula

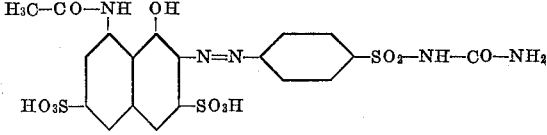

6. The water-soluble monoazo-dyestuff of the formula
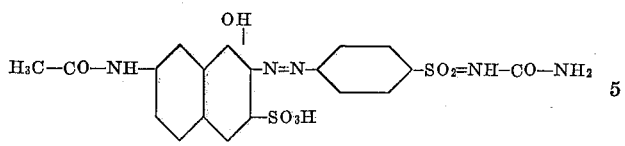
7. The water-soluble monoazo-dyestuff of the formula
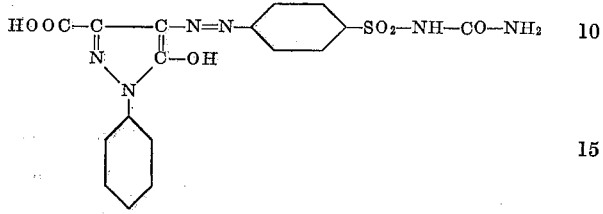
8. The water-soluble monoazo-dyestuff of the formula
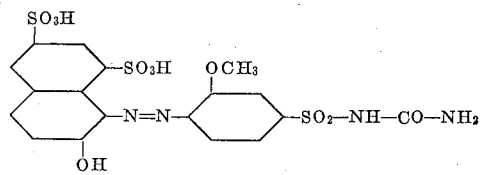
References Cited by the Examiner
UNITED STATES PATENTS
| | | | |
|---|---|---|---|
| 2,476,259 | 7/1949 | Mayer et al. | 260—148 |
| 2,920,070 | 1/1960 | Jirou et al. | 260—207 XR |
| 3,096,356 | 7/1963 | Jirou et al. | 260—207 XR |
CHARLES B. PARKER, *Primary Examiner.*
R. J. FINNEGAN, D. M. PAPUGA, *Assistant Examiners.*